Dec. 10, 1968 D. N. FISTELL 3,416,001

ADDITIONAL EQUIPMENT CONTROLS FOR RECORD PLAYERS

Filed Sept. 1, 1967

INVENTOR.
DAVID N. FISTELL
BY
R. H. Galbraith
ATTORNEY

United States Patent Office
3,416,001
Patented Dec. 10, 1968

3,416,001
ADDITIONAL EQUIPMENT CONTROLS FOR RECORD PLAYERS
David N. Fistell, 1001 Bannock St., Denver, Colo. 80204
Filed Sept. 1, 1967, Ser. No. 664,999
7 Claims. (Cl. 307—38)

ABSTRACT OF THE DISCLOSURE

A first group of electrical plug-receptacles to receive the supply plugs of record players, tape-recorders, and similar low amperage equipment, and a second group of similar receptacles to receive the supply plugs of heavier amperage equipment such as A-F amplifiers and the like. The first group of receptacles are individually in series with the primary of a transformer, the secondary of which energizes a solenoid to close a high amperage secondary circuit, the second group of receptacles being individually in series with said secondary circuit.

SPECIFICATION

Figure 1:
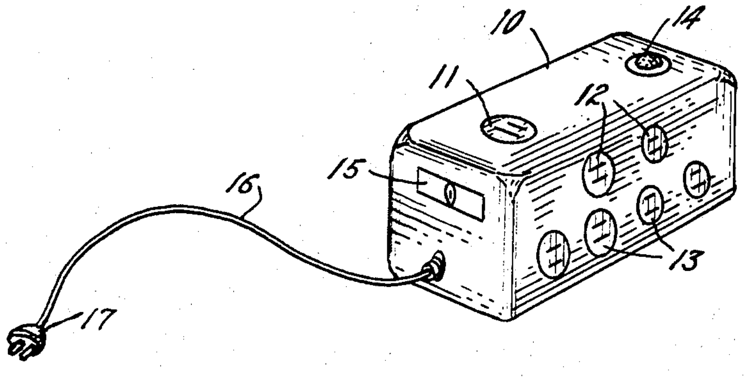

It is the present custom for those interested in the reproduction of sound to employ a record player, a tape recorder, or the like for the initial pick-up of the sound and then employ various amplifiers and speaker setups for the audio reproduction of, or the recording of, the sound. This usually requires a complicated and untidy confusion of electric cords to convey the usual AC house current to the record player and to each of the pieces of additional equipment and results in a plurality of individual "shut off" devices and controls.

The principal object of this invention is to provide a single multiple receptacle control having a single supply cord for plugging into the AC house circuit and a plurality of receptacles into which a plurality of reproduction and amplifying elements may be conveniently plugged, so arranged that a single control will simultaneously control all of the plugged-in additional equipment.

Most present day record players and tape recorders are provided with switches for automatically shutting off the power supply when the final record or tape has been played and are also provided with individual manual switches for shutting off the power supply. However, the opening of the latter switches does not shut off the power supply to the additional equipment and the latter will continue to draw current until individually shut off. Attempts have been made to connect the additional equipment to the conventional automatic player switch to obtain a single switch control for all equipment. These attempts have not been satisfactory for the miniature, low-amperage switch incorporated in the player will be quickly destroyed by the high amperage current requested for the additional equipment.

A further object of this invention is to incorporate a solenoid in the above circuit control, connected in series with the AC supply and the record player, which will simultaneously open and close all the additional equipment circuits in correspondence with the action of the record player switch to avoid accidental retention of closed circuits.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

Figure 2:
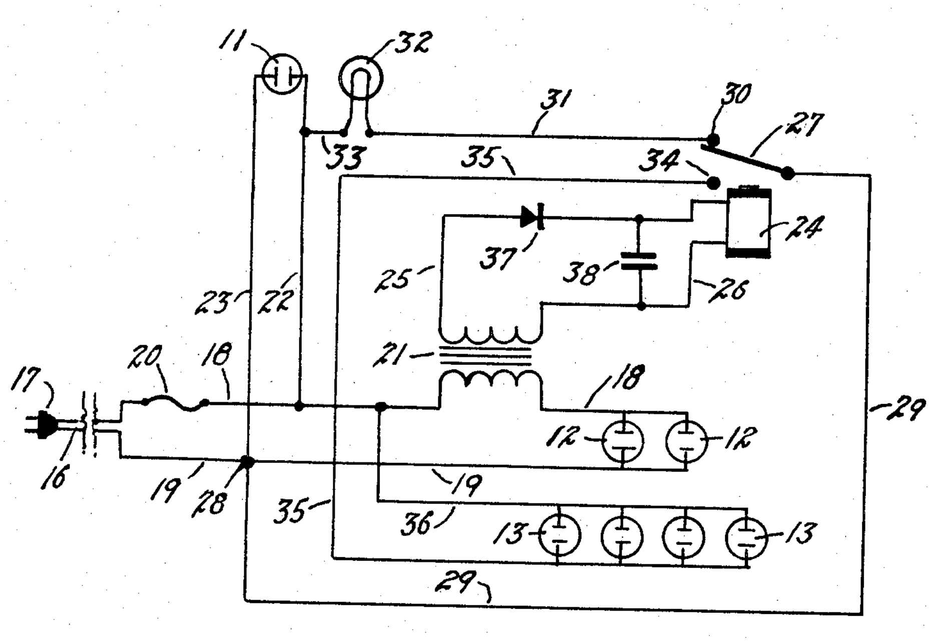

In the drawing:

FIG. 1 is a perspective view illustrating the possible external appearance of the automatic shut off control of this invention; and FIG. 2 is a circuit diagram thereof.

This invention is preferably mounted in a convenient enclosure or case 10, of molded plastic or similar material, provided with a lamp receptacle 11, a plurality of phono-receptacles 12, a plurality of additional equipment receptacles 13, a signal light jewel 14, a fuse compartment 15, and a power cord 16 terminating in a conventional power plug 17.

The operating circuit, as diagrammed in FIG. 2, is supplied with AC house current from the plug 17 through the cord 16. The cord 16 feeds two main input conductors 18 and 19. The main conductor 18 is fused, as indicated at 20, and serially connected through the primary of a transformer 21, with one contact of each of the phono-receptacles 12. The main conductor 19 is directly connected to the other contact of each of the phono-receptacles 12 so that each of the latter is individually in series with the primary of the transformer 21. The lamp receptacle 11, however, is connected in parallel with the main conductors 18 and 19 by means of receptacle conductors 22 and 23, respectively.

The secondary of the transformer 21 is connected to the terminals of a relay solenoid 24 through secondary conductors 25 and 26 so that the relay solenoid will be energized in correspondence with the induced secondary current of the transformer 21 to attract a switch blade 27. The switch blade 27 is connected to the main input-conductor 19, as indicated at 28, by means of a blade conductor 29 and is spring loaded so as to be normally in contact with a signal light contact 30 from which a conductor 31 leads to a signal lamp 32 which illuminates the signal light jewel 14 in the case 10. The circuit is completed through the lamp 32 by means of a second lamp conductor 33 connected to the main input conductor 18 through the receptacle conductor 22.

When the relay solenoid is energized, the blade 27 will be attracted to open the lamp circuit at the contact 30 and close a receptacle circuit by engaging a receptacle contact 34 which is connected, through a receptacle conductor 35, with one contact of each of the additional equipment receptacles 13. The other contact of each of the receptacles 13 is connected to the main conductor 18 through a second receptacle conductor 36. Thus, it can be seen that the receptacle 11 is permanently energized and the equipment receptacles 13 will be energized whenever an electrical load is plugged into any one of the phono-receptacles 12.

To increase the efficiency of the relay action, a diode 37 is inserted in the secondary circuit 25–26 to rectify the alternating secondary current and the resulting unidirectional half wave is filtered by bridging the conductors 25 and 26 adjacent the solenoid by a filter capacitor 38 which tends to reduce the amplitude of the peaks and smooth out the resulting sine wave to produce relatively smooth quiet DC attraction of the blade 27.

It is believed the function of the device will be understood from the above. Briefly, let us assume: that a record player, in the "off" position, is plugged into one of the phono-receptacles 12; that an amplifier and speaker system is plugged into one of the additional equipment receptacles 13; and that the power plug 17 is plugged into the house AC source. The result will be that any house lamp plugged into the lamp receptacle 11 and the signal lamp 32 and the jewel 14 will be illuminated. No other currents will be flowing.

Now, let us assume the record player is turned "on."

This will close the circuit 18–19 through the record player motor to energize the transformer 21 and the relay solenoid 24 so as to close the blade 27 to the contact 34 to energize the additional equipment receptacles 13 and the equipment plugged therein, and will extinguish the signal lamp 32 by breaking the circuit at the contact 30 so as to indicate the system is functioning.

Should the record player be manually or automatically turned off, the solenoid will be instantly deenergized and the amplifier or other additional equipment will be automatically shut-off without further attention.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. An additional equipment control for record players comprising:

(a) a first electrical-plug receptacle to receive the current supply plug of a record player;

(b) a second electrical-plug receptacle to receive the current supply plug of additional electrical equipment;

(c) a primary circuit adapted to be plugged into an AC source, said first receptacle being connected in series with said primary circuit;

(d) a transformer, the primary of which is also connected in series with said primary circuit; and (e) a solenoid energized from the secondary of said transformer to close said primary circuit to said second electrical-plug receptacle when an electrical load is connected to said first electrical-plug receptacle.

2. An additional equipment control for record players as described in claim 1 having a plurality of said first electrical-plug receptacles each being individually connected in series with said primary circuit.

3. An additional equipment control for record players as described in claim 2 having a plurality of said second electrical-plug receptacles each being individually connected in parallel with said primary circuit when said solenoid closes said primary circuit.

4. An additional equipment control for record players as described in claim 3 having a diode in series between the secondary of said transformer and said solenoid to rectify the current supplied to said solenoid.

5. An additional equipment control for record players as described in claim 4 having a filter capacitor bridged across the said solenoid to filter and smooth out the DC peaks supplied by said diode.

6. An additional equipment control for record players as described in claim 5 in which closure of the primary circuit by said solenoid is accomplished by means of a spring-loaded switch blade attracted to a closing contact by the electro-magnetic attraction of said solenoid.

7. An additional equipment control for record players as described in claim 6 having a visual signal circuit including said switch blade and a signal contact arranged so that when said blade is attracted to the closing contact it will break contact with said signal contact to deenergize said signal circuit.

References Cited

UNITED STATES PATENTS

| | | | |
|---|---|---|---|
| 1,669,784 | 5/1928 | Scofield | 307—112 X |
| 2,506,171 | 5/1950 | Perillo | 307—112 |
| 3,054,994 | 9/1962 | Haram | 307—112 X |
| 3,207,847 | 9/1965 | Epstein | 179—1 |
| 3,337,778 | 8/1967 | Becker | 307—112 |

ROBERT K. SCHAEFER, *Primary Examiner.*

J. B. JOIKE, *Assistant Examiner.*

U.S. Cl. X.R.

179—1; 307—112; 317—123